United States Patent
Li et al.

(10) Patent No.: US 6,444,322 B1
(45) Date of Patent: Sep. 3, 2002

(54) ADHESIVE COMPOSITIONS AND METHODS OF USE THEREOF

(75) Inventors: Shulong Li, Spartaburg, SC (US); Dany Felix Maria Michiels, Haaltert (BE)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/461,274

(22) Filed: Dec. 15, 1999

Related U.S. Application Data

(63) Continuation of application No. 09/037,092, filed on Mar. 9, 1998, now Pat. No. 6,046,262.

(51) Int. Cl.[7] .................................................. B32B 9/04
(52) U.S. Cl. ................. 428/447; 428/451; 428/335 AK; 528/38; 106/287.11
(58) Field of Search ........................... 528/38; 428/447, 428/451, 355 AK; 106/287.11

(56) References Cited

U.S. PATENT DOCUMENTS

| | | | |
|---|---|---|---|
| 3,852,051 A | * 12/1974 | Fahey | ................................ 65/3 |
| 5,064,876 A | 11/1991 | Hamaada et al. | ............. 522/99 |
| 5,082,738 A | 1/1992 | Swofford | .................... 428/437 |
| 5,178,675 A | 1/1993 | Sexsmith | ............... 106/287.11 |
| 5,310,386 A | 5/1994 | Mizuno et al. | ............. 474/205 |
| 5,654,099 A | 8/1997 | Pelton | ........................ 428/378 |

FOREIGN PATENT DOCUMENTS

| | | |
|---|---|---|
| EP | 440425 | 8/1991 |
| EP | 506975 | 10/1992 |
| EP | 665390 | 8/1995 |
| EP | 678687 | 10/1995 |
| EP | 695793 | 2/1996 |
| EP | 738748 | 10/1996 |

* cited by examiner

*Primary Examiner*—Margaret G. Moore
(74) *Attorney, Agent, or Firm*—Terry T. Moyer; William S. Parks

(57) ABSTRACT

A composition for the promotion of adhesion between a rubber formulation and a textile substrate is provided. The inventive composition comprises either a mixture of specific amine functional silanes and organo-functional silanes having reactive groups or groups with an affinity for rubber. The inventive method entails the use of the inventive composition or a silane compound having both an amine moiety and a reactive group having an affinity for rubber formulations, particularly an unsaturated carbon-carbon bond. The composition may be utilized to adhere any standard reinforcement-type textile, such as polyester or polyamide, to a standard rubber composition, such as SBR, NBR, or EPDM. A method for adhering textiles to rubber formulations is also provided involving a pre-dip, -spray, -coat, and the like, of the inventive composition on a reinforcement-type textile surface followed by the contacting of the rubber formulation. Optionally, and preferably, the process involves the extra utilization of resorcinol-formaldehyde latex as an effective bonding agent to improve the adhesion between the two layers. The resulting textile-reinforced rubber product may be utilized as an automobile fan or timing belt, an automobile tire component, and any other rubber article which requires long-lasting, durable textile reinforcement.

4 Claims, No Drawings

ADHESIVE COMPOSITIONS AND METHODS OF USE THEREOF

CROSS REFERENCE TO RELATED APPLICATIONS

This application is a continuation of co-pending application 09/037,092, filed on Mar. 9, 1998, now U.S. Pat. No. 6,046,262.

FIELD OF THE INVENTION

This invention relates to adhesion promotion compositions which provide excellent adhesive characteristics between rubber and textile substrates. Such compositions comprise specific mixtures of aminosilanes and other organosilanes or specific compounds having both an aminosilane moiety and a group having an affinity for rubber compositions. These inventive compositions may be utilized to activate a textile surface for further contact with a rubber alone or a resorcinol-formaldehyde latex (RFL) or similar type of adhesive compound to which a rubber may subsequently be adhered. The methods utilizing these particular adhesion promotion compositions are also contemplated within this invention.

DISCUSSION OF THE PRIOR ART

It has long been known that adhering a textile, particularly one composed of filaments having high tenacity to a rubber enhances the modulus and tensile strength of the rubber component and provides long-lasting durability, particularly in high friction applications. Examples of such applications include fan and timing belts within automobile engines; vehicle tires; conveyor belts; and the like. The main requirement of such textile-reinforced rubber articles has been the strength of adhesion between the textile and the rubber. Without any primer treatment, the textile will not effectively adhere to the rubber. A weak bond between the two components results in separation of the two layers and mechanical failure of the resulting composite. Thus, it has been and is necessary to provide a textile treatment to enhance the adhesion of these two distinct components.

Previous methods of providing such adherence between rubber and textile layers include coating or impregnating the textile layer with a formaldehyde latex (such as a resorcinol-formaldehyde vinyl-pyridine rubber latex or RFL), pre-coating with an RFL latex and an amino functional polyacrylate, as in U.S. Pat. 5,654,099, to Pelton, and in European Patent Application 665,390, to Tsubakimoto Chain Company, or utilizing a pre-activated textile which has reactive pendant groups to facilitate adhesion between the fabric surface and the reactive sites on the rubber layer, all of the aforementioned references being herein entirely incorporated by reference. The RFL coating method results in a composition which does not always provide sufficient adhesion between layers. Pre-activated textiles, such as a polyester fibers coated with an epoxy adhesion enhancer, are typically used in combination with an RFL treatment to further improve the textile adhesion to rubbers. Although such pre-activated textiles perform well in many cases, there remains a need for less expensive methods and compositions for adhesion promotion between rubber and textile layers in order ultimately to produce a reinforced, long-lasting, and durable rubber product.

Also worth mentioning are U.S. Pat. Nos. 5,064,876, to Hamada et al., and U.S. Pat. No. 5,082,738, to Swofford, both of which teach a primer composition for promoting adhesion for polymer films. Such disclosed compositions comprise aminofunctional silanes. However, neither of these references teach the application of textiles to rubber formulations for reinforcement purposes nor do they teach or fairly suggest the necessary combination of an amine functional group and another organo-functional group, in particular a reactive group having an affinity for rubber, as is now required within the inventive composition and method.

DESCRIPTION OF THE INVENTION

It is thus an object of the invention to provide improved adhesion for a long-lasting and durable textile-reinforced rubber product. A further object of the invention is to provide a relatively inexpensive method of achieved such improved adhesion. Another object of the invention is to provide an adhesion promoter which ultimately provides a textile-reinforced rubber product which does not exhibit adhesive failure. Yet another object of this invention is to provide a stable aqueous primer composition that, when applied before an RFL treatment, activates the textile substrate in order to provide greatly improved adhesion to various rubber compounds.

Accordingly, this invention concerns a composition for promoting the adhesion between a rubber composition layer and a textile reinforcing layer comprising a mixture of at least two different silane compounds, at least one compound selected from (I) and at least one compound selected from (II); wherein (I) and (II) include the following:

(I) aminosilanes selected from the group consisting of

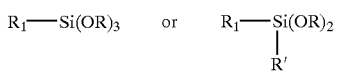

wherein R is $C_1$–$C_6$ alkyl, $R_2$ is an amine functional group, and R' is an alkyl- or aromatic-acyl group;

(II) organo-functional silanes selected from the group consisting of

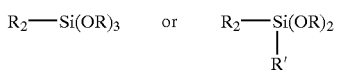

wherein $R_2$ is a group containing a radical selected from the group consisting of a mercapto moiety, a sulfide moiety, an isocyanate moiety, an epoxy moiety, a pyridine moiety, a hydrophobic saturated alkyl moiety, and a moiety having at least one unsaturated carbon-carbon bond, and R and R' are defined as for (I) above. Nowhere within the prior art has such a specific adhesion promotor composition been disclosed or practiced, particularly for activating textile substrates in order to improve adhesion to rubbers. Furthermore, nor has such a specific composition or method of utilizing such a composition been taught or fairly suggested. Such compositions and methods provide significant advantages over the standard adhesion compositions and methods of the state of the art.

Also, it has been discovered that a stable aqueous dispersion of the composition (a) above can be obtained without the use of any dispersing agents or surfactants. Component (II) of the inventive composition is not water soluble (some of the covered compounds can even react with water and thus are not stable in aqueous solution). Although a water dispersion of the component (II) can be produced utilizing surfactants, such dispersions have very limited shelf life. Besides, the surfactants necessary to make such dispersions tend to affect adhesion adversely since surfactants are known to migrate to the interfaces and interfere with the microscopic intimate contact between two uniting materials. However, by mixing components (I) and (II) together, then slowly adding water to the mixture, a stable aqueous dispersion/solution can be obtained without utilizing any potentially deleterious surfactants or dispersing agents.

The relative cost of the inventive compositions is very low at the preferred level of usage, particularly when compared with the pre-activated textiles mentioned above. All of these characteristics and improvements with the inventive compositions and methods thus translate into lower costs for the user. Additionally, the inventive compositions and methods can be utilized with any rubber compositions and with any type of smooth filament textile normally utilized as a rubber reinforcement material. Examples of rubber compositions include, and are not limited to, natural rubber, polyurethane rubber, styrene-butadiene rubber (SBR), acrylonitrile-butadiene rubber (NBR), butyl rubbers, fluorinated rubbers, and ethylene-propylene-diene rubber (EPDM). Modified rubbers which are potentially useful, though more expensive, include hydrogenated SBR, hydrogenated NBR, and carboxylated NBR. Suitable textiles include, and are not limited to, those comprising polyester, polyester/cotton blends, polyamides, such as nylon-6 or -6,6, polyaramids (such as Kevlar®, available from DuPont), polypropylene, boron derivatives, glass fibers, and carbon fibers. The textile component may be dyed or colored various shades and hues in order to facilitate categorizing the different widths, lengths, etc., of products such as, without limitation, timing belts, and the like,. for automobiles. Finally, the inventive compositions and methods, when utilized and/or practiced as intended, result in a textile-reinforced rubber product which does not exhibit textile/rubber.adhesive failure.

Preferably, the inventive composition comprises (I) an amine-functional silane component and (II) an organo-functional silane component, which includes an unsaturated carbon-carbon bond. As noted above, other reactive groups may be employed on the organo-functional silane component, such as, isocyanates, mercaptos, and epoxies, only as examples. Being alkoxysilanes, also, both components (I) and (II) hydrolyze in the presence of water, then couple with either each other and each with itself to form oligomers. It is therefore expected that pre-hydrolyzed silane products can be utilized as substitutes for components (I) and (II). Obviously some of the organic functional group in component (II) will react with the amine group in component (I) upon mixing. However, it is the mixture of these two components that generates the unexpected synergistic adhesion improvement which cannot be achieved practically with either component alone.

Preferably, the inventive composition comprises a mixture of two separate compounds, an amine-functional silane (I) having the following structure:

wherein R is $C_1$–$C_6$ alkyl and $R_1$ is an amine-functional group having the molecular structure of

wherein R is defined for (I) as in claim 1 and y is 0–4, and an organo-functional silane (11) having the following structure:

wherein R is $C_1$–$C_6$ alkyl and $R_2$ is a group having an unsaturated carbon-carbon bond. Of particular preference are (I) arninoethylaminopropyltrimethoxysilane, available from Dow Coming, Midland, Michigan, and (II) 3-methacryloxypropyltrimethoxysilane, also available from Dow Corning. These particular compounds provide the best adhesion promotion between textile substrates and rubber compositions for the lowest cost. Also, the amount of (I) and (II) is measured in weight ratios, with the preferred range being from about 1:1 [(I) to (II)] to about 100:1. Most preferred is a weight ratio of from about 2:1 to about 10:1. The inventive composition may be present in a dispersion, either aqueous or non-aqueous, or in a neat solution diluted with an organic solvent. An aqueous dispersion without any surfactants added is preferred, as noted previously. The preferred concentration of silanes is from about 0.1 to about 5% on the weight of the fabric (owf) with a preferred range being from about 0.5 to about 2% owf. Furthermore, it is preferred that, after the application of the inventive composition, a RFL treatment be used to increase the adhesive qualities of the entire product.

Any standard rubber additives, including ultraviolet absorbers, antioxidants, dyes, colorants, curing agents, perfumes, antistatic agents, fillers (such as carbon black), and the like may be added to the rubber. To the textile substrate may be added any other standard textile additives, such as dyes, colorants, pigments, ultra violet absorbers, antioxidants, and wetting agents. To the inventive composition and RFL used in combination with the inventive composition may be added wetting agents, antioxidants, filler dispersion (such as carbon black, silica and ZnO dispersions).

The preferred inventive method of producing a textile-reinforced rubber composite comprises the sequential steps of (a) providing a textile substrate;
(b) contacting the textile substrate with a composition comprising either
  (i) a mixture of at least two different silane compounds, one compound selected from (I) and the other selected from (II); wherein (I) and (II) include the following:
    (I) amine-functional silanes selected from the group consisting essentially of

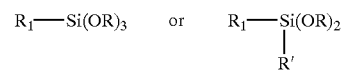

wherein R is $C_1$–$C_6$ alkyl, $R_1$ is an amine-containing functional group, and R' is an alkyl- or aromatic-acyl group;
    (II) organo-functional silanes selected from the group consisting essentially of

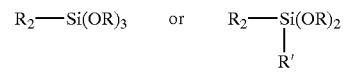

wherein R is $C_1$–$C_6$ alkyl, $R_2$ is a group containing a radical selected from the group consisting essentially of a mercapto moiety, a sulfide moiety, an isocyanate moiety, an epoxy moiety, a pyridine moiety, a hydrophobic saturated alkyl moiety, and a moiety having at least one unsaturated carbon-carbon bond, and R' is the same as defined for (I) above; or
  (ii) at least one functional silane containing both an amine-functional group and a moiety having an affinity for rubber (such as an unsaturated carbon-carbon bond);

(c) heating the textile substrate at a temperature of from about 120 to about 250° C. for from about 15 seconds to about 5 minutes, preferably about 3 minutes;

(d) optionally coating or impregnating the textile substrate with an RFL composition;

(e) combining at least a portion of the resulting treated textile substrate with a rubber formulation to from a textile-reinforced rubber composite; and (f) curing the textile-reinforced rubber composite.

In this-process, contacting step (b) may be performed by any standard, well known method, including dipping, padding, spraying, coating, impregnating, and the like. This silane pre-treatment of the textile in essence "activates" the fibrous surface by effectively coating the textile with the adhesion promoter having reactive groups and groups having affinity for the rubber layer oriented in a position to facilitate the subsequent contact and adhesion of the rubber layer with the textile layer. One of ordinary skill in the art would understand and be familiar with the addition and contacting of the subject textile and rubber formulation with the potentially preferred RFL latex component as well as the rubber formulation contacting step (e), above. Furthermore, curing step (f) is performed in any conventional manner, such as through heat-activated vulcanization in the presence of a curing agent (such as organic peroxide). Again, such a step should be well within the purview of the ordinarily skilled artisan in this field.

DETAILED DESCRIPTION OF THE PREFERRED EMBODIMENT

The Examples below are indicative of the particularly preferred embodiment within the scope of the present invention:

EXAMPLE 1

7 parts of aminoethylaminopropyltrimethoxy silane and 3 parts of 3-methacryloxypropyltrimethoxysilane were admixed in a beaker. To this mixture was slowly added a total amount of 1000 parts water in order to obtain a stable dispersion of silanes. Subsequently, the resultant dispersion was then transferred to a receptacle suitable for dipping fabric substrates. A 100% polyester sample of smooth filament fabric, cut into a few swatches of 2 inches by 12 inches and each swatch was then consecutively dipped into the dispersion, run through two compressing rolls to squeeze out excess liquid, and then dried at 177° C. for 3 minutes in an oven. The fabric was then impregnated with a regular resorcinol formaldehyde vinylpyridine latex (formula provided by a technical bulletin released by Indspec of Pittsburgh, Pa., October, 1991). A formulated and uncured SBR rubber was then sandwiched between the two treated textile layers. The whole structure was then pressed at four tons/m² pressure at 150° C. for 30 minutes. The resultant product obtained a cohesive peel strength of 36 lbs/inch. The peeling is termed cohesive because the resultant tearing occurred within the rubber itself and did not result in an adhesive separation between the rubber and the textile substrate.

EXAMPLE 2

The same procedure was followed as in EXAMPLE 1 except that the mixture of amine-functional silane and methacrylic silane was replaced by 2-(vinylbenzylamino)-ethyl-3-aminopropyltrimethoxysilane. A peel strength of 30 lbs/inch was obtained.

EXAMPLE 3

Comparative

The same basic procedure followed as in EXAMPLE 1 except that the RFL latex treatment was not utilized. A peel strength of 5 lbs/inch was obtained.

EXAMPLE 4

Comparative

The same procedure was followed as in EXAMPLE 1 except that the mixture of amine-functional silane and methacrylic silane was replaced by the aminoethylaminopropyl-trimethoxysilane alone. A peel strength of 24 lbs/inch was obtained.

EXAMPLE 5

Comparative

The same procedure was followed as in EXAMPLE 2 except that the mixture of amine-functional silane and methacrylic silane was replaced by the methacryloxy-propyl-trimethoxysilane alone. A peel strength of 15 lbs/inch was obtained.

EXAMPLE 6

Comparative

The same procedure was followed as in EXAMPLE 1 except that the inventive mixture of silanes was not utilized and the RFL was the sole adhesive compound. The resulting peel strength obtained was 6 lbs/inch.

There are, of course, many alternative embodiments and modifications of the present invention which are intended to be included within the spirit and scope of the following claims.

What we claim is:

1. An adhesive composition for the promotion of the adhesion of a rubber substrate to a textile substrate, said composition comprising at least two layers, wherein a first layer comprises at least one RFL and a second layer, bonded directly to said RFL layer, comprises at least one component selected from the group consisting of i) at least one functional silane containing both an amine-functional group and a moiety containing a radical selected from the group consisting of a mercapto moiety, a sulfide moiety, an isocyanate moiety, an epoxy moiety, a pyridine moiety, a hydrophobic saturated alkyl moiety, and a moiety having at least one unsaturated carbon-carbon, and ii) a combination of at least one aminosilane selected from the group consisting of

wherein for both (I) and (II), R is $C_1$–$C_6$ alkyl, $R_1$ is an amine functional group, and R' is an alkyl- or aromatic-acyl group.

2. The adhesive composition of claim 1 wherein said component as defined by ii) is present.

3. The adhesive composition of claim 1 wherein said component as defined by i) is present.

4. An adhesive composition for the promotion of the adhesion of a rubber to a textile substrate, said composition comprising at least one RFL and at least two different silane constituents; wherein said silane constituents are bonded to one another and only one of said silane constituents is bonded directly to said at least one RFL; wherein at least one of said two different silane constituents is an aminosilane and at least one of said two different silane constituents is an organo-functional silane; wherein said aminosilane is selected from the group

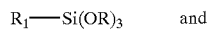  (I)

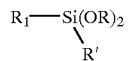  (II)

wherein R is $C_1$–$C_6$ alkyl, R' is an amine functional group, and R' is an alkyl- or aromatic-acyl group; and wherein said at least one organo-functional silane silane constituent selected from the group, selected from the group consisting of

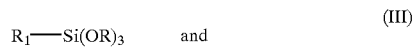  (III)

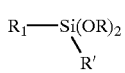  (IV)

wherein $R_2$ is a group containing a radical selected from the group consisting of a mercapto moiety, a sulfide moiety, an isocyanate moiety, an epoxy moiety, a pyridine moiety, a hydrophobic saturated alkyl moiety, and a moiety having at least one unsaturated carbon-carbon bond, and wherein R is $C_1$–$C_6$ alkyl and R' is an alkyl- or aromatic-acyl group.

* * * * *